(12) United States Patent
Ito et al.

(10) Patent No.: US 7,456,510 B2
(45) Date of Patent: Nov. 25, 2008

(54) WIND POWER GENERATOR

(75) Inventors: Ryosuke Ito, Tokyo (JP); Kiyoshi Sato, Tokyo (JP); Hideaki Tamura, Tokyo (JP); Katsushi Kawakami, Ichikawa (JP)

(73) Assignee: Zephyr Corporation, Tokyo (JP)

(*) Notice: Subject to any disclaimer, the term of this patent is extended or adjusted under 35 U.S.C. 154(b) by 0 days.

(21) Appl. No.: 10/534,216

(22) PCT Filed: Nov. 13, 2003

(86) PCT No.: PCT/JP03/14463

§ 371 (c)(1),
(2), (4) Date: Apr. 10, 2006

(87) PCT Pub. No.: WO2004/047284

PCT Pub. Date: Jun. 3, 2004

(65) Prior Publication Data
US 2006/0249957 A1    Nov. 9, 2006

(30) Foreign Application Priority Data
Nov. 15, 2002    (JP)    ............... 2002-332463

(51) Int. Cl.
| F03D 9/00 | (2006.01) |
| H02P 9/04 | (2006.01) |
| H02P 3/00 | (2006.01) |
| H02P 9/06 | (2006.01) |
| H02P 15/00 | (2006.01) |

(52) U.S. Cl. .......................... 290/44; 322/10
(58) Field of Classification Search ............... 290/44; 322/10
See application file for complete search history.

(56) References Cited

U.S. PATENT DOCUMENTS 2,480,687 A * 8/1949 Albers et al. ............ 416/132 R (Continued)

FOREIGN PATENT DOCUMENTS

EP    1340910 A1 *    9/2003

(Continued)

OTHER PUBLICATIONS

Notice of Rejection Ground, Japanese Patent Application No. 2004-553165, Drafting Date: Apr. 2, 2008, Mailing No. 193439, Mailing Date: Apr. 8, 2008.

*Primary Examiner*—Nicholas Ponomarenko
*Assistant Examiner*—Pedro J Cuevas
(74) *Attorney, Agent, or Firm*—Greer, Burns & Crain, Ltd.

(57) ABSTRACT

When a wind velocity sensor detects a wind velocity higher than a predetermined level, a timer device starts a waiting timer function during an operation timer period shorter than the waiting timer period. After the waiting timer period is over, the waiting timer function is switched to an operation timer function, and a switching relay switches a generator to a motor only during an operation timer period. Then, a driving circuit performs a start assisting rotation. After the operation timer period is over, the waiting timer period re-starts. This process is repeated. When during this period, the number of rotations of a rotor monitored by a rotation number measuring device, based on the output voltage $V_m$ of a three-phase conduction coil exceeds a predetermined number of rotations, the charging of a battery by a three-phase generator is started.

8 Claims, 15 Drawing Sheets

U.S. PATENT DOCUMENTS

| | | | |
|---|---|---|---|
| 3,388,305 A * | 6/1968 | Smith | 318/707 |
| 3,404,763 A * | 10/1968 | Reed | 192/103 C |
| 4,540,930 A * | 9/1985 | Siedband | 322/4 |
| 4,868,406 A * | 9/1989 | Glennon et al. | 290/4 R |
| 4,908,565 A * | 3/1990 | Cook et al. | 322/10 |
| 5,309,081 A * | 5/1994 | Shah et al. | 322/10 |
| 5,363,032 A * | 11/1994 | Hanson et al. | 322/10 |
| 5,430,362 A * | 7/1995 | Carr et al. | 318/779 |
| 5,581,168 A * | 12/1996 | Rozman et al. | 318/723 |
| 5,594,322 A * | 1/1997 | Rozman et al. | 322/10 |
| 6,838,779 B1 * | 1/2005 | Kandil et al. | 290/31 |
| 6,989,655 B2 * | 1/2006 | Eguchi et al. | 322/23 |
| 6,998,726 B2 * | 2/2006 | Sarlioglu et al. | 290/31 |
| 7,122,994 B2 * | 10/2006 | Anghel et al. | 322/60 |
| 7,388,300 B2 * | 6/2008 | Anghel et al. | 290/39 |
| 2001/0048290 A1 * | 12/2001 | Underwood et al. | 322/20 |
| 2002/0030365 A1 * | 3/2002 | Underwood et al. | 290/40 B |
| 2002/0108387 A1 * | 8/2002 | Barrett et al. | 62/323.3 |
| 2004/0027077 A1 * | 2/2004 | Xu et al. | 318/107 |
| 2006/0169560 A1 * | 8/2006 | Knowles | 192/53.1 |

FOREIGN PATENT DOCUMENTS

| | | |
|---|---|---|
| JP | 63-162975 | 10/1988 |
| JP | A 61-49697 | 3/1989 |
| JP | 01-142274 | 5/1989 |
| JP | U 6-9400 | 2/1994 |
| JP | 08-107637 | 4/1996 |
| JP | 08-322298 | 12/1996 |
| JP | 2000-249036 | 9/2000 |
| JP | 2001-268994 | 9/2001 |
| JP | 2002-027679 | 1/2002 |
| JP | 2002-136192 | 5/2002 |
| JP | 2002-315395 | 10/2002 |
| JP | 2006109554 A * | 4/2006 |

* cited by examiner

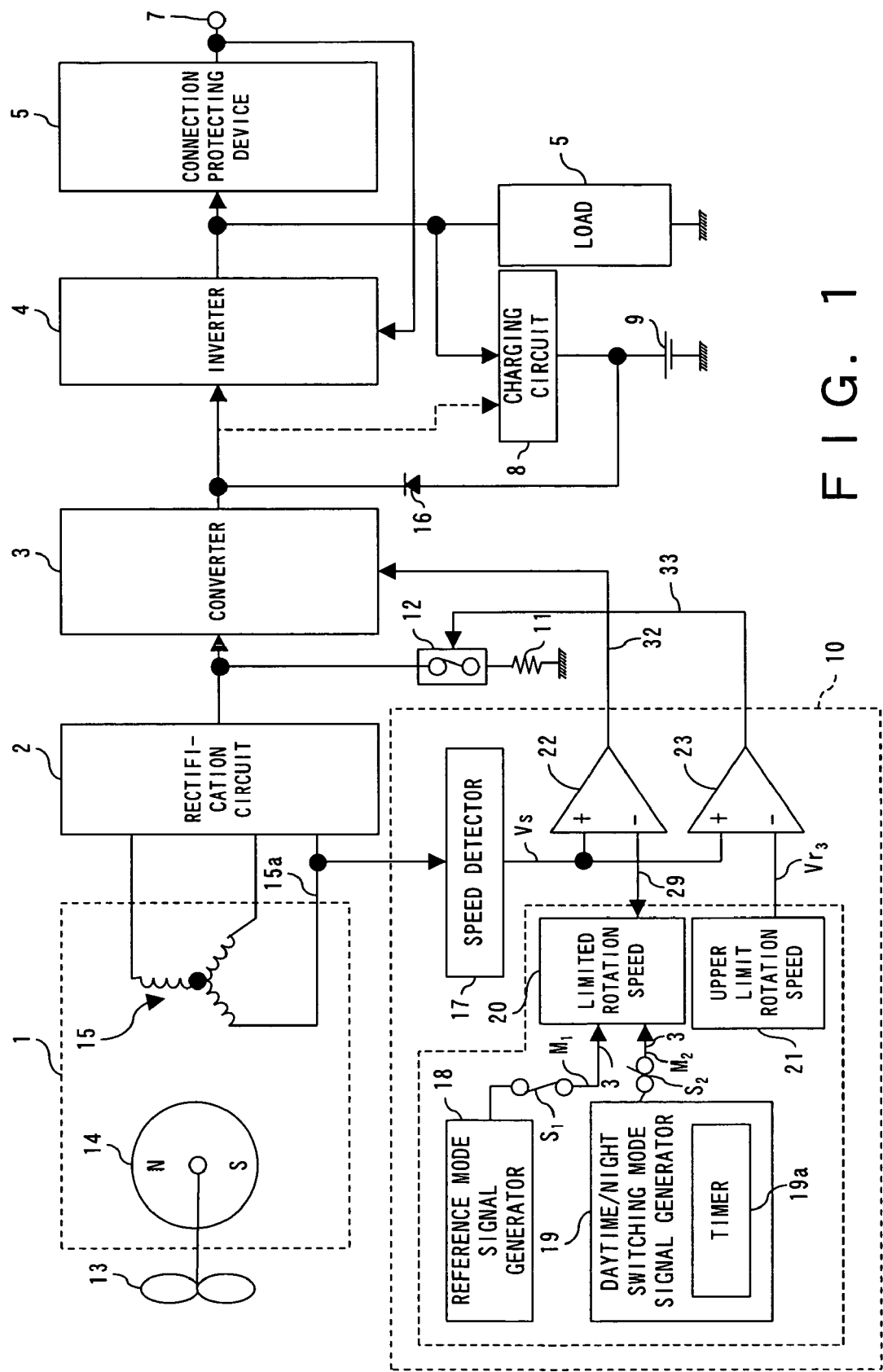
F I G. 1

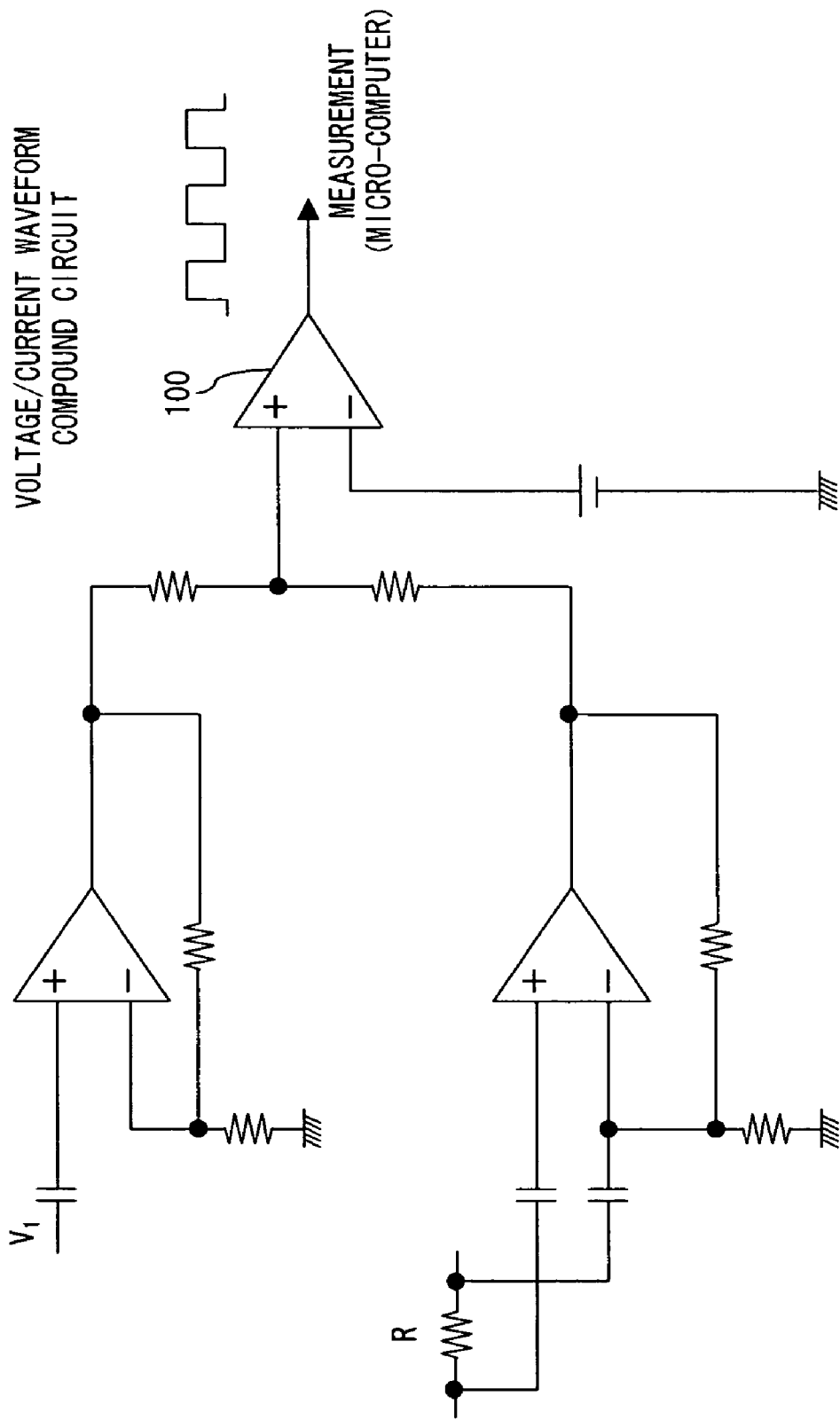
F I G. 6

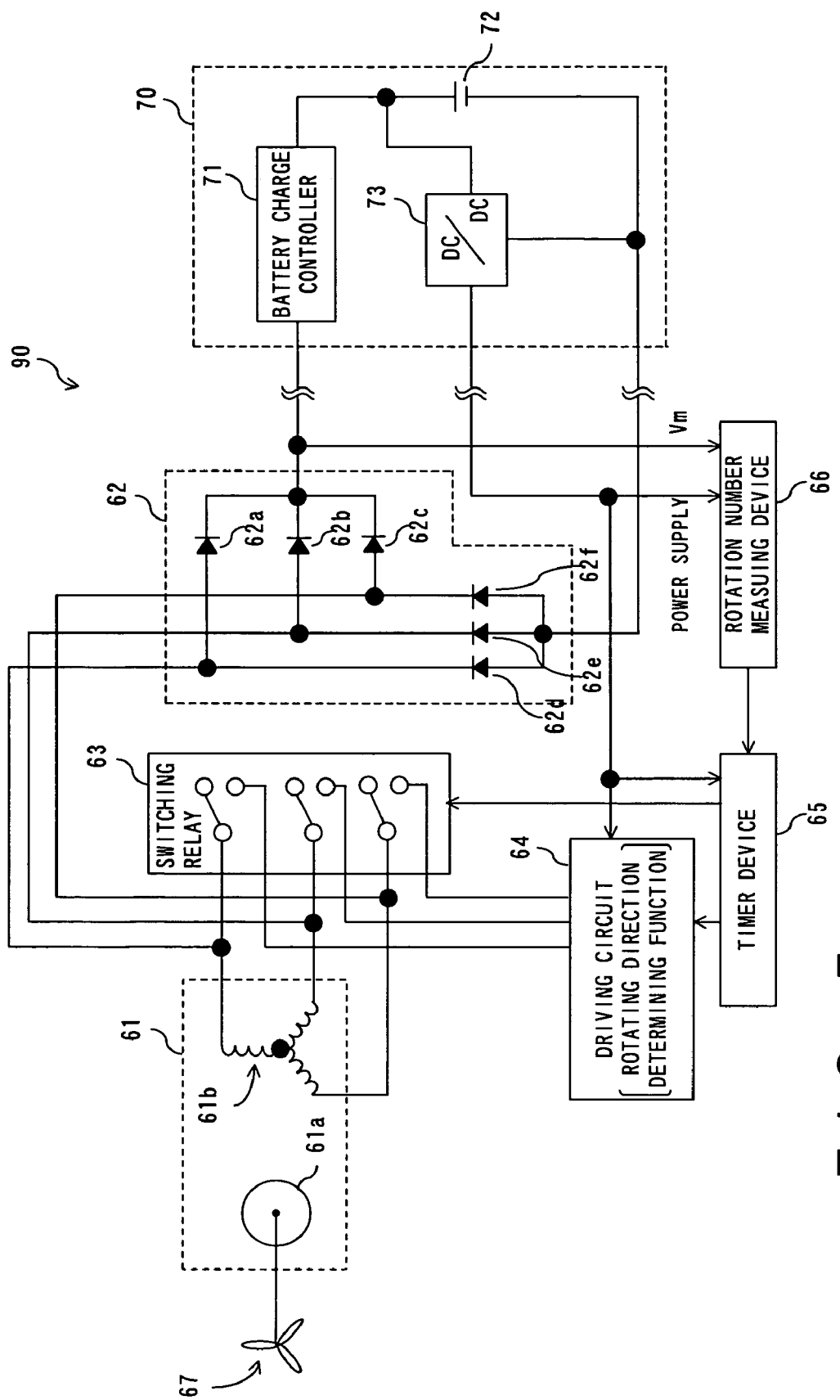
F I G. 7

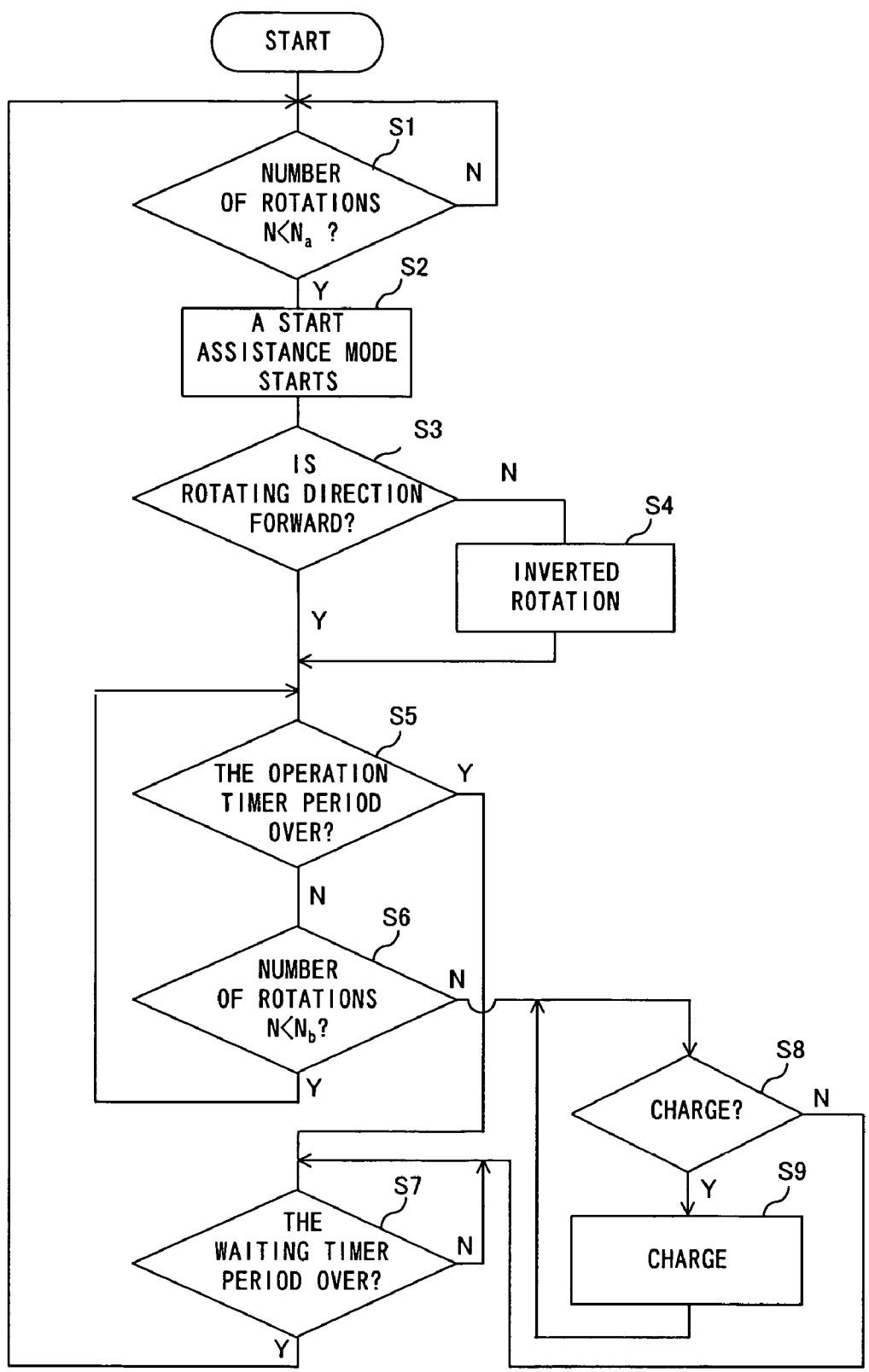
F I G. 8

WIND POWER GENERATOR

TECHNICAL FIELD

The present invention relates to a wind power generating device.

BACKGROUND ART

Conventionally, there are a variety of types of wind power generators, and each type of wind power generator has different characteristics. For example, when classifying wind power generators by the direction of attachment of a shaft for supporting a windmill, they are divided into a vertical shaft type the direction of attachment of the shaft of which is vertical and a horizontal shaft type the direction of attachment of the shaft of which is horizontal. The vertical type includes the Savonius windmill, the Darius windmill and the like, and the horizontal type includes the propeller type and the like.

When classifying them with regard to whether they function predominantly based on a torque for rotating a windmill, generated by drag or lift, they are divided into a drag type in which drag mainly functions, a lift type in which lift mainly functions and a drag/lift type in which each of drag and lift functions to a similar degree. For example, the Savonius windmill is of the drag type, and the Darius windmill and the propeller type are of the lift type.

Since for example, a drag type windmill is rotated well by weak winds or so-called breezes, it can generate power from weak winds. However, when generating large amounts of power, equipment becomes structurally large and accordingly uneconomical.

If the blade area of a drag type windmill is made large in order that it might be rotated even by a weak wind, at the time of strong winds, wind force from the rotating direction works against the rotation and the resistance becomes large proportional to the size of blades. Accordingly, the power generating efficiency degrades, which is a problem. However, a lift type windmill can be used not only for low power generation but also can easily be used for high power generation. Simultaneously, for example, some small lift type windmills can generate power of 400W from winds of a velocity of 12.5 m/second.

However, a lift type windmill requires wind of a high velocity as a rotation starting velocity which is the wind velocity needed to rotate a windmill to generate power. Therefore, it cannot be rotated by weak winds and sufficient power generating efficiency cannot be obtained, which is a problem.

If the blade elevation against a wind direction of a lift type windmill is increased in order for the windmill to be rotated even at the time of strong winds, drag increases and becomes a resistant force against the rotation of the windmill. Accordingly, the rotation efficiency of the windmill degrades.

However, as a method for solving this problem of a lift type windmill, a method for providing a windmill with a wing angle adjustment function and rotating the windmill even at the time of weak winds by this adjustment function unlike a conventional fixed wing angle type windmill is proposed (for example, see Patent reference 1).

Patent Reference 1:

Japanese Patent Application Publication No. H8-322297 "Wind Power Generator" (Abstract, representative drawings)

Recently, demand for a small-sized wind power generator has been high demand and arises from the viewpoint of earth environment preservation. However, providing such a small-sized wind power generator with the above-mentioned wing-angle adjustment function leads to high cost of the device, which is not preferable since it goes against the trend of a low cost underlying the essential desire for a small size.

DISCLOSURE OF INVENTION

The first object of the present invention is to provide a wind power generating device capable of suppressing noise and vibration at the time of strong wind.

The second object of the present invention is to provide a wind power generating device capable of maintained power generation while reducing the number of rotations even at the time of strong wind.

The third object of the present invention is to provide a wind power generating device capable of maintained power generation while reducing the number of rotations even at the time of strong wind and also capable of suppressing the change in discharge/charge current of a storage battery to a minimum level.

The fourth object of the present invention is provide a wind power generating device with a start-assisting function capable of rotating even at the time of weak wind and also capable of saving power consumption as much as possible at the time of rotation start-assisting with the start-assisting function corresponding to a small sized wind power generating device [adg1].

The wind power generating device of the present invention comprises a permanent magnet type generator for generating in connection with the rotation shaft of a rotation wing which is rotated in the forward direction by wind, a start assistance means for switching the generator to an electric motor and performing a start assisting rotation which rotates the rotation shaft in the forward direction, and a generator restoration means for restoring the motor to the generator when the start assisting rotation of the start assistance means is suspended.

Another wind power generating device of the present invention comprises a rectification circuit connected to a wind power generator for generating AC voltage, a DC/DC conversion circuit including at least one switching device, connected to the rectification circuit, for converting the level of the DC output voltage of the rectification circuit by the on/off control of the switching device, a rotation speed detection means for detecting the rotation speed of the wind power generator, a limited rotation speed signal generating means for generating a signal indicating the limited rotation speed of the wind power generator, a comparison means for comparing a signal for indicating the detected speed obtained from the rotation speed detection means with the limited rotation speed obtained from the limited rotation speed signal generating means, a switch control circuit for controlling the switching device in such a way that the output voltage of the DC/DC conversion circuit may become a predetermined value and also controlling the switching device in such a way as to increase the output voltage of the DC/DC conversion circuit in response to the output of the comparison means, indicating that the detected speed exceeds the limited rotation speed, a start assistance means for switching the generator to a motor and performing a start assisting rotation which rotates the rotation shaft in the forward direction, and a generator restoration means for restoring the motor to the generator when the start assisting rotation by the start assistance means is suspended.

Another wind power generating device of the present invention comprises a rectification circuit connected to a wind power generator for generating AC [adg2]voltage, a DC/DC conversion circuit including at least one switching device, connected to the rectification circuit, for converting the level of the DC output voltage of the rectification circuit by the on/off control of the switching device, a DC/AC conversion circuit connected to the DC/DC conversion circuit, a rotation speed detection means for detecting the rotation speed of the wind power generator, a limited rotation speed signal generating means for generating a signal indicating the limited rotation speed of the wind power generator, a comparison means for comparing a signal for indicating the detected speed obtained from the rotation speed detection means with the limited rotation speed obtained from the limited rotation speed signal generating means, a control circuit for controlling the DC/AC conversion circuit so as to increase output voltage of the DC/AC conversion circuit in response to the output of the comparison means which indicates the detected speed is higher than the limited rotation speed, a start assistance means for switching the generator to an electric motor and performing a start assisting rotation which rotates the rotation shaft in the forward direction, and a generator restoration means for restoring the motor to the generator when the start assisting rotation by the start assistance means is suspended.

Another wind power generating device of the present invention comprises a windmill, an AC generator provided with a rotor rotated by the windmill, a rectification circuit connected to the AC generator, a power conversion circuit connected to the rectification circuit, a storage battery or capacitor connected to the power conversion circuit, a rotation detector for detecting the number of rotations of the windmill, a reference rotation number setter for setting the number of rotations of the windmill, a control circuit connected to the rotation detector, reference rotation number setter and power conversion circuit, for controlling the power conversion circuit in such a way as to increase the ratio between the input voltage and output voltage of the power conversion circuit when the detected number of rotations obtained from the rotation detector exceeds the reference number of rotations, a start assistance means for switching the DC generator to an electric motor and performing a start assisting rotation which rotates the rotation shaft in the forward direction, and a generator restoration means for restoring the motor to the AC generator when the start assisting rotation by the start assistance means is suspended.

BRIEF DESCRIPTION OF DRAWINGS

FIG. 1 shows the configuration of the wind power generating device in the first preferred embodiment of the present invention.

FIGS. 3~6 explain the rotation number detection circuit in the first or second preferred embodiment of the present invention.

FIG. 7 is the circuit block diagram of the wind power generating device provided with a start-assisting function in the third preferred embodiment of the present invention.

FIG. 8 is a flowchart showing the operation of the start assisting function in the wind power generating device.

BEST MODE FOR CARRYING OUT THE INVENTION

Figure 2:
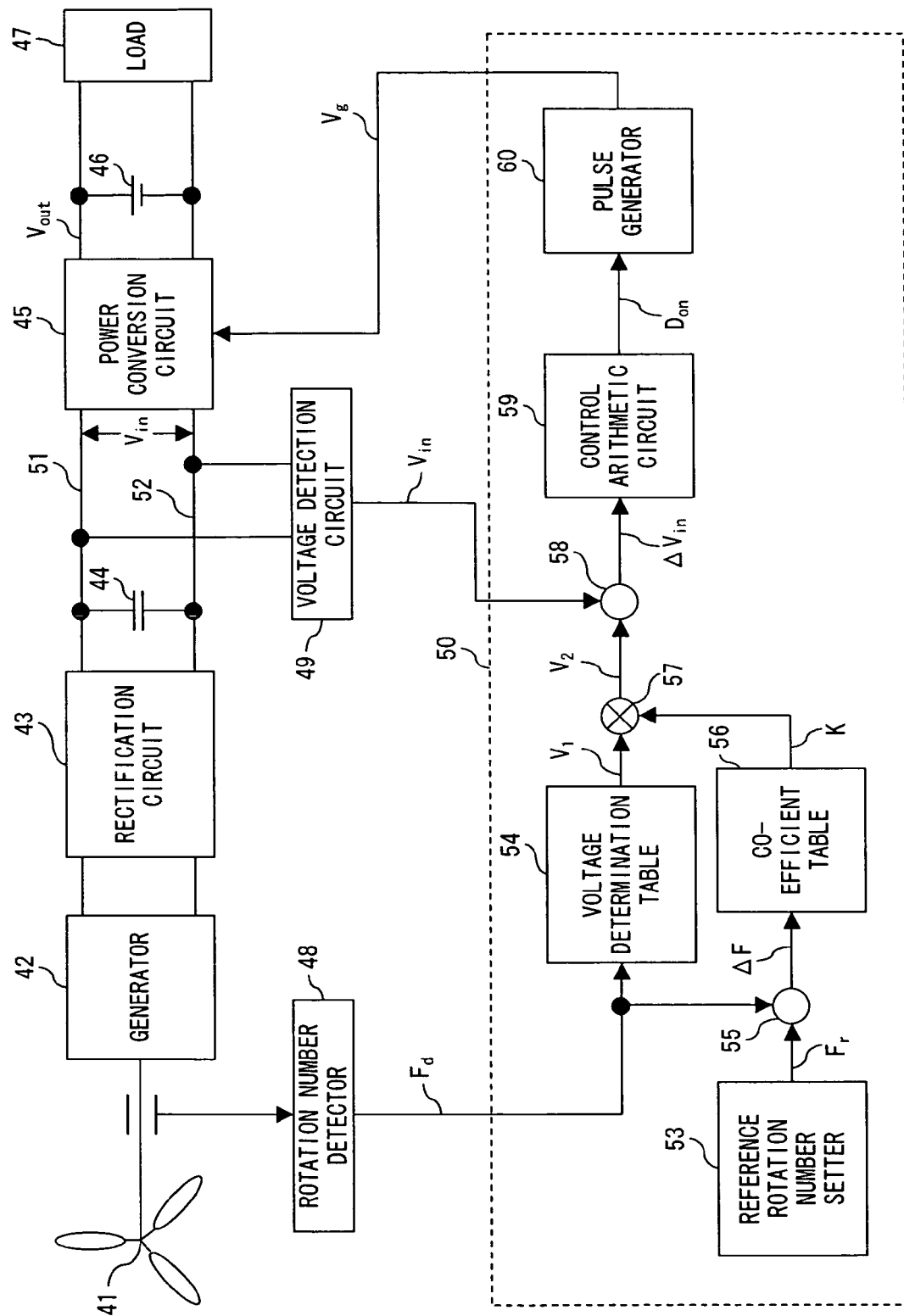
FIG. 2 shows the configuration of the wind power generating device in the second preferred embodiment of the present invention.

The preferred embodiments of the present invention are described below with reference to the drawings.

FIG. 1 shows the configuration of a wind power generator power control device in the first preferred embodiment of the present invention.

The wind power generator power control device comprises a wind power generator 1, a rectification circuit 2, a DC/DC converter 3 as an output current control means and a DC/DC conversion means, an inverter 4, a load 5, a connection protecting device 6, AC mains connecting terminal 7, a charging circuit 8, a storage battery 9, a rotation control circuit 10, an upper limited rotation speed setting fixed load 11 and a switch 12.

The wind power generator 1 is a publicly known AC generator comprising a rotor 13 constructed from a permanent magnet connected to a windmill 13 and a stator with a three-phase armature coil 15. This AC generator can be an external magnet type or a built-in magnet type.

The rectification circuit 2 as an AC/DC conversion means, connected to the armature coil 15 of the wind power generator 1 is a publicly known three-phase bridge type rectification circuit. The rectification circuit 2 converts three-phase AC voltage generated in the armature coil 15 by the rotation of the windmill 13 and rotor 14, into DC voltage. The output voltage of the rectification circuit 2 is, for example, a fairly low voltage of 50V or less.

The DC/DC converter 3 connected to the rectification circuit 2 converts the output voltage of the rectification circuit 2 into a higher voltage (for example, 350V) and maintains a constant output voltage of the DC/DC converter 3. Simultaneously, the DC/DC converter 3 adjusts the output voltage to control output current according to the present invention. Therefore, the DC/DC converter 3 also has the function of a current control means for rotation speed restriction of the present invention in addition to DC conversion function.

The inverter 4 connected to the converter 3 converts the DC voltage outputted from the converter 3 into the sine wave AC voltage of a commercial frequency (for example, 50 Hz). The inverter 4 can be of, for example, a publicly known bridge type inverter, a half-bridge type inverter or the like.

The load 5 connected to the inverter 4 is an AC load in a wind power generating system. The connection protecting device 6 inserted and connected between the inverter 4 and the commercial connecting terminal 7 includes a switch needed to separate the wind power generating system from the AC mains when the AC mains fails and a variety of publicly known means necessary for connection.

The charging circuit 8 connected to the inverter 4 rectifies the output voltage of the inverter 4 or voltage supplied from the commercial connecting terminal 7 and charges the storage battery 9. As shown by broken lines, the charging circuit 8 can also be connected to the converter 3 and the storage battery 9 can also be charged by the DC output voltage of the DC/DC converter 3. When not fully charged, the storage battery 9 functions as a load in the wind power generating system. In order to supply the load 5 with the power of the storage battery 9, the storage battery 9 is connected to the input terminal of the inverter 4 via a diode 16 as a discharging means. An inverter exclusively for the storage battery output can also be inserted and connected between the storage battery 9 and load 5.

The rotation speed restriction load 11 for suppressing the rotation speed of the wind power generator 1 to an upper limit level is connected to the rectification circuit 2 via the switch 12. This load 11 can also be connected to the output terminal of the converter 3, the output terminal of the inverter 4 or the output terminal of the armature coil 15.

The rotation control circuit 10 comprises a rotation speed detector 17, a reference mode signal generator 18, a daytime/night switching mode signal generator 19, a limited rotation speed signal generator 20, an rotation speed upper limit signal generator 21, first and second comparators 22 and 23, and mode selection switches S1 and S2.

The rotation speed detector 17 is connected to the output line 15a of the armature coil 15. The rotation speed detector 17 detects the frequency of the AC output voltage of the wind power generator 1 and outputs a speed detection signal Vs with a voltage value corresponding to this frequency.

The reference mode signal generator 18 generates a reference signal M1 indicating that the rotation speed restriction of the wind power generator 1 is performed in a reference mode. In this case, a reference mode means restricting the rotation speed on the same condition all day, that is, during 24 hours.

The daytime/night switching mode signal generator 19 has the timer 19a built-in, and generates a daytime/night switching mode signal M2, including a high level signal indicating a first time zone of, for example, 8~20 o'clock in the daytime and a low level signal indicating a second time zone of, for example, 20~8 o'clock at night. Instead of separating the first time zone from the second time zone by the timer 19a, daytime/night can also be automatically determined by an optical sensor, photovoltaic power generation or the like to generate a daytime/night switching mode signal.

The reference mode signal generator 18 and the daytime/night switching mode signal generator 19 are connected to the limited rotation speed signal generator 20 via the reference mode selection switch S1 and the daytime/night switching mode selection switch S2, respectively. Either of the switches S1 and S2 can be selectively turned on. Instead of providing the switches S1 and S2, either of the reference mode signal generator 18 and daytime/night switching mode signal generator 19 can also be selectively operated to selectively transmit either of the signals M1 and M2.

The limited rotation speed signal generator 20 generates a limited rotation speed signal Vr1 or Vr2 consisting of a voltage proportional to a limited rotation speed according to a designated mode.

One of the input terminals of the first comparator 22 is connected to the speed detector 17 and the other is connected to the output line 29 of the limited rotation speed signal generator 20. Since the line 29 becomes the first reference voltage Vr1 or second reference voltage Vr2, a high level comparison output can be obtained in the output line 32 while the rotation speed detection signal Vs obtained from the speed detector 17 exceeds the first or second reference voltage Vr1 or Vr2, and is transmitted to the converter 3. Thus, the output is used to suppress the rotation speed of the wind power generator 1 from increasing.

One of the input terminals of the second comparator 23 is connected to the speed detector 17 and the other is connected to the rotation speed upper limit signal generator 21. The rotation speed upper limit signal generator 21 generates an upper limited rotation speed signal consisting of a third reference voltage Vr3 higher than the first reference voltage Vr1. Therefore, when the rotation speed detection signal Vs exceeds the third reference voltage Vr3, the comparator 23 transmits a high level output to the line 33 to turn the switch 12 on. When the switch 12 is turned on, a load of fairly small resistance value is connected to the rectification circuit 2. Then, the output current, that is, armature current of the wind power generator 1 increases to suppress the increase of the rotation speed of the wind power generator 1 by the electromagnetic brake action due to its armature reaction. This control by the second comparator 23 is exercised when the control of the converter 3 by the output of the first comparator 22 cannot suppress the rotation speed of the wind power generator 1 to a desired level.

When a rotation speed suppressing operation by the output of the first comparator 22 alone cannot suppress the rotation speed to a desired level and the detected rotation speed Vs exceeds the third reference voltage Vr3, the output of the second comparator 23 turns the switch 12 on. Then, the output current of the wind power generator 1 increases to suppress the increase of the rotation speed. Therefore, in this preferred embodiment, both the converter 3 and auxiliary load 11 can suppress the increase of rotation speed smoothly and gradually.

The first preferred embodiment can achieve the first object.

FIG. 2 shows the block diagram of the configuration of the wind power generator of the second preferred embodiment of the present invention.

The wind power generating device in the preferred embodiment shown in FIG. 2 comprises a windmill 41, an AC generator 42 provided with a rotor rotated by this windmill 41, a rectification circuit connected to this AC generator 42, a smoothing capacitor 44, a power conversion circuit 45 connected to this smoothing capacitor 44, a storage battery 46 connected to this power conversion circuit 45, a load 47 connected to this storage battery 46, a rotation number detector, that is, speed detector 48 detecting the number of rotations of the windmill 41, an input voltage detection circuit 49 for detecting the input voltage of the power conversion circuit 45, that is, the voltage of the smoothing capacitor 44 and a control circuit 50.

The power conversion circuit 45 is connected to first and second DC power supply lines 51 and 52 connected to the smoothing capacitor 44, and can change a ratio $V_{out}/V_{in}$ of an input voltage $V_{in}$ and an output voltage $V_{out}$. In this preferred embodiment, although the storage battery 46 also functions as a smoothing capacitor, a smoothing capacitor can also be connected to the storage battery 46.

The rotation number detector 48 detects the number of rotations, that is, the rotation speed of the windmill, that is, the rotor of the generator 42 by a publicly known method and outputs a rotation number detection signal $F_d$.

The input voltage detection circuit 49 detects the input voltage $V_{in}$ of the power conversion circuit 45 and outputs a voltage detection signal $V_{in}$. Here, for the sake of convenience, both the input voltage and output voltage of the input voltage detection circuit 49 are represented by $V_{in}$. This input voltage $V_{in}$ corresponds to the output voltage of the generator 42.

The control circuit 50 is connected to the rotation number detector 48, voltage detection circuit 49 and power conversion circuit 45. When the detected number of rotations $F_d$ obtained from the rotation number detector 48 exceeds the reference number of rotations $F_r$, the control circuit 50 controls the power conversion circuit 45 in such a way as to increase the ratio $V_{out}/V_{in}$ of the input voltage $V_{in}$ and output voltage $V_{out}$ of the power conversion circuit 45.

More specifically, the control circuit 50 comprises a reference rotation number setter 53 for setting the reference number of rotations $F_r$ corresponding to the limit number of rotations of the windmill 41, a voltage determination table 54 as a generator output voltage determining means for determining the output voltage of an generator 42, at which the maximum power of the generator 42 can be obtained for the number of rotations $F_d$ detected by the rotation number detector 48, a subtracter 55 as a first subtraction means for calculating a difference $\Delta F$ between the detected number of rotations $F_d$ and the reference number of rotations $F_r$, a coefficient table 56 as a coefficient generating means for transmitting 1 as a coefficient value when the rotation number difference $\Delta F$ is zero or less and transmitting a value less than 1 as a coefficient when the rotation number difference $\Delta F$ is larger than zero, a multiplier 57 as a multiplication means for generating a correction voltage specifying signal V2 by multiplying the determined output voltage V1 obtained from the generator output voltage determination table 54 by the co-efficient K obtained from the co-efficient table 56, a subtracter 58 as a second subtraction means for calculating a difference $\Delta V_{in}$ between the input voltage specifying signal V2 obtained from the multiplier 57 and the detected voltage $V_{in}$ obtained from the input voltage detection circuit 49, the second subtracter 58 and an arithmetic control circuit 59 and a pulse generator 60, as a control signal generating circuit for generating a signal for controlling the power conversion circuit 45 in such a way as to bring the output $V_{in}$ of the output circuit 49 of the input voltage detection circuit 49 close to the correction voltage specifying signal V2, based on the voltage difference $\Delta V_{in}$ obtained from the second subtracter 58. The reference rotation number setter 53 can also be provided outside the control circuit 50.

The voltage determination table 54 is comprised in memory, and stores a relationship between the number of rotations $F_d$ and the generator output voltage V1 at which the maximum power can be obtained. The table 54 can store the voltages V1 of all the rotation values $F_d$ or store selected steps of rotation values $F_d$ and voltages V1 corresponding to them. If there is no data corresponding to the detected number of rotations $F_d$, data corresponding to the number of rotations close to the detected number of rotations is used. Instead of the voltage determination table 54, an arithmetic expression can also be stored in the memory and voltage V1 can also be calculated by substituting the detected number of rotations $F_d$ to the arithmetic expression.

The voltage V1 indicates both the output voltage of the generator 42, at which the maximum power can be obtained from the generator 42 and the input voltage of the power conversion circuit 45.

The voltage determination table 54 uses the detected number of rotations $F_d$ obtained from the rotation number detector 48 as an address signal and outputs a signal indicating a target voltage V1 corresponding to it. When the wind is not strong, voltage V1 output by the voltage determination table 54 is the target output voltage of the generator 42.

The first subtracter 55 calculates $F_d - F_r = \Delta F$ by subtracting the reference number of rotations $F_r$ from the detected number of rotations $F_d$ obtained from the rotation number detector 48. The first subtracter 55 stores a coefficient K=1 when $\Delta F \leq 0$, and stores a coefficient less than 1 when $\Delta F > 0$. When the output of the first subtracter 55, $\Delta F > 0$, a coefficient satisfying $0 < K < 1$ is selected. Value K in this case can be made $1/\Delta F$. Thus, when $\Delta F > 0$, the first subtracter 55 outputs a co-efficient K corresponding to the value $\Delta F$, using it as an address. Instead of storing a plurality of pieces of data indicating a plurality of coefficients K and a plurality of values $\Delta F$, an arithmetic expression indicating a relationship between $\Delta F$ and K can also be stored, and a co-efficient K can also be calculated by substituting the value $\Delta F$ to this arithmetic expression.

The multiplier 17 calculates KV1=V2 by multiplying the voltage V1 output by the voltage determination table 54 by the coefficient output by the coefficient table 56 and outputs it. V2 is a voltage specifying signal corrected for the time of strong winds.

The second subtracter 58 calculates $V_{in} - V2 = \Delta V_{in}$ and outputs a signal indicating a difference between the input voltage detection signal $V_{in}$ and the voltage specifying signal V2.

The control arithmetic circuit 59 using $\Delta V_{in}$ as input is, for example, comprised of a publicly known proportional integration (PI) circuit, and generates a duty factor signal $D_{on}$ corresponding to $\Delta V_{in}$. Namely, a duty factor signal $D_{on}$, equivalent to a signal obtained by smoothing $\Delta V_{in}$, that is, a duty specifying signal is obtained.

The pulse generator 60 as a switch control signal generating means generates a control signal $V_g$ with a pulse of a width specified by the duty factor signal $D_{on}$ and transmits it to the gate of the switch Q1 of the power conversion circuit 45.

The second preferred embodiment can achieve the second and third objects.

Conventionally, a method for detecting a rotation signal by installing a rotation number sensor or the like on the rotation shaft of a generator is often used. This preferred embodiment of the present invention is a circuit for measuring the number of rotations, using a pulsed signal contained in the output of a generator without using a rotation sensor. Thus, an exact number of rotations can be measured on the controller side using only a two-wire power wire.

Figure 3:
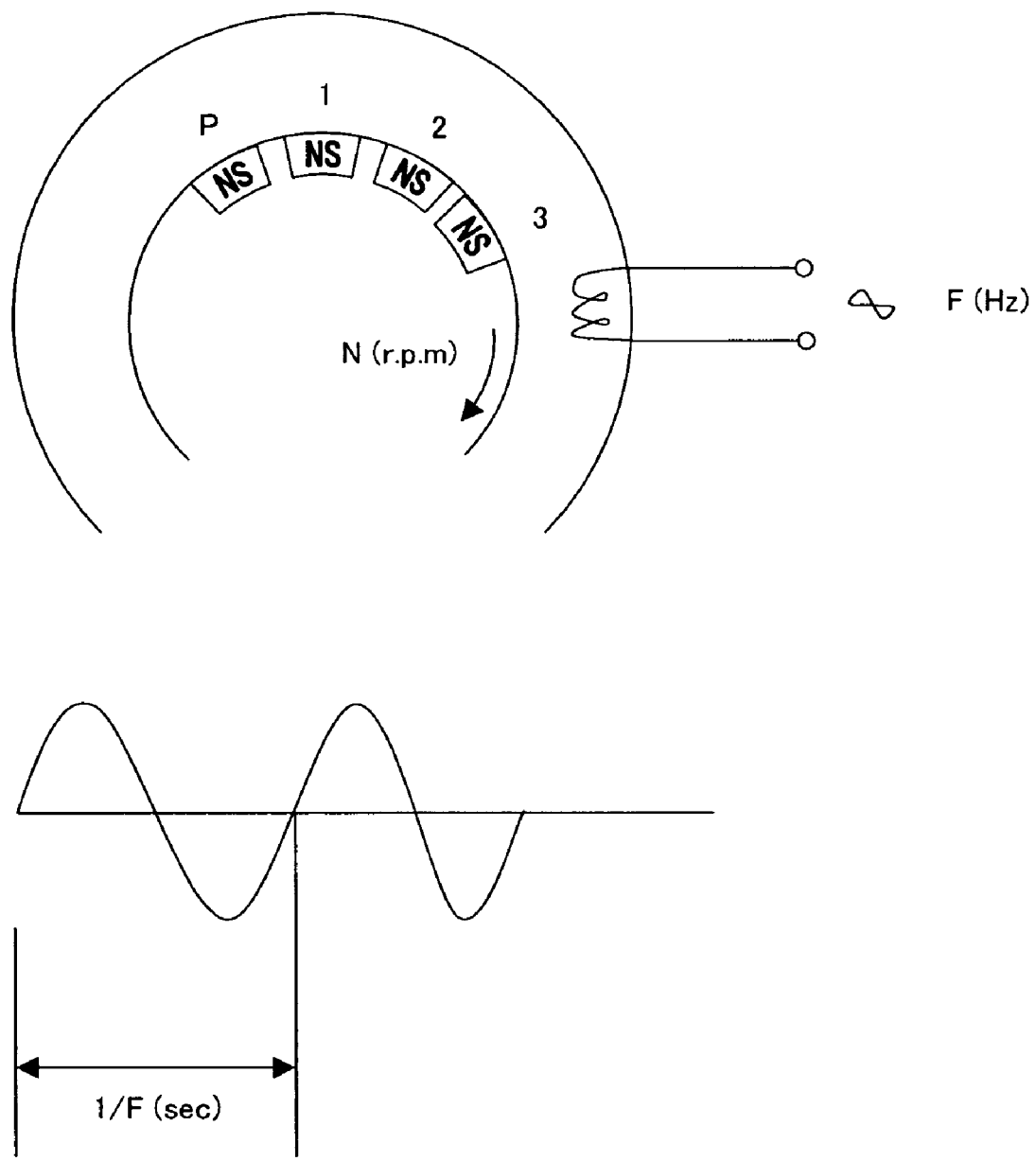

In a permanent magnet generator rotating N times per minute (see FIG. 3), the relationship between the number of poles of a magnet and an AC output frequency F is as follows.

$$F = N/60 \times P (\text{Hz})$$

Figure 4:
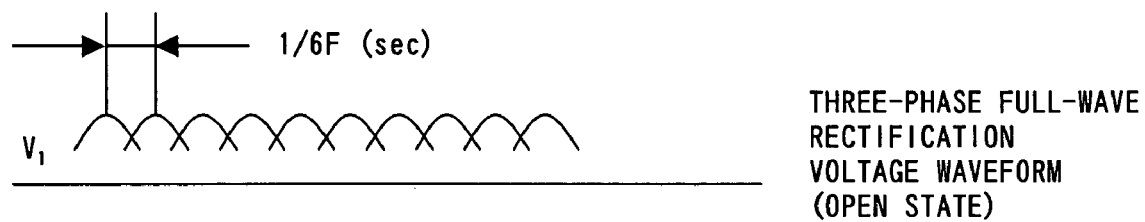

FIG. 4 shows an output signal, which are full-wave-rectified in a generator with a three-phase coil.

Figure 5:
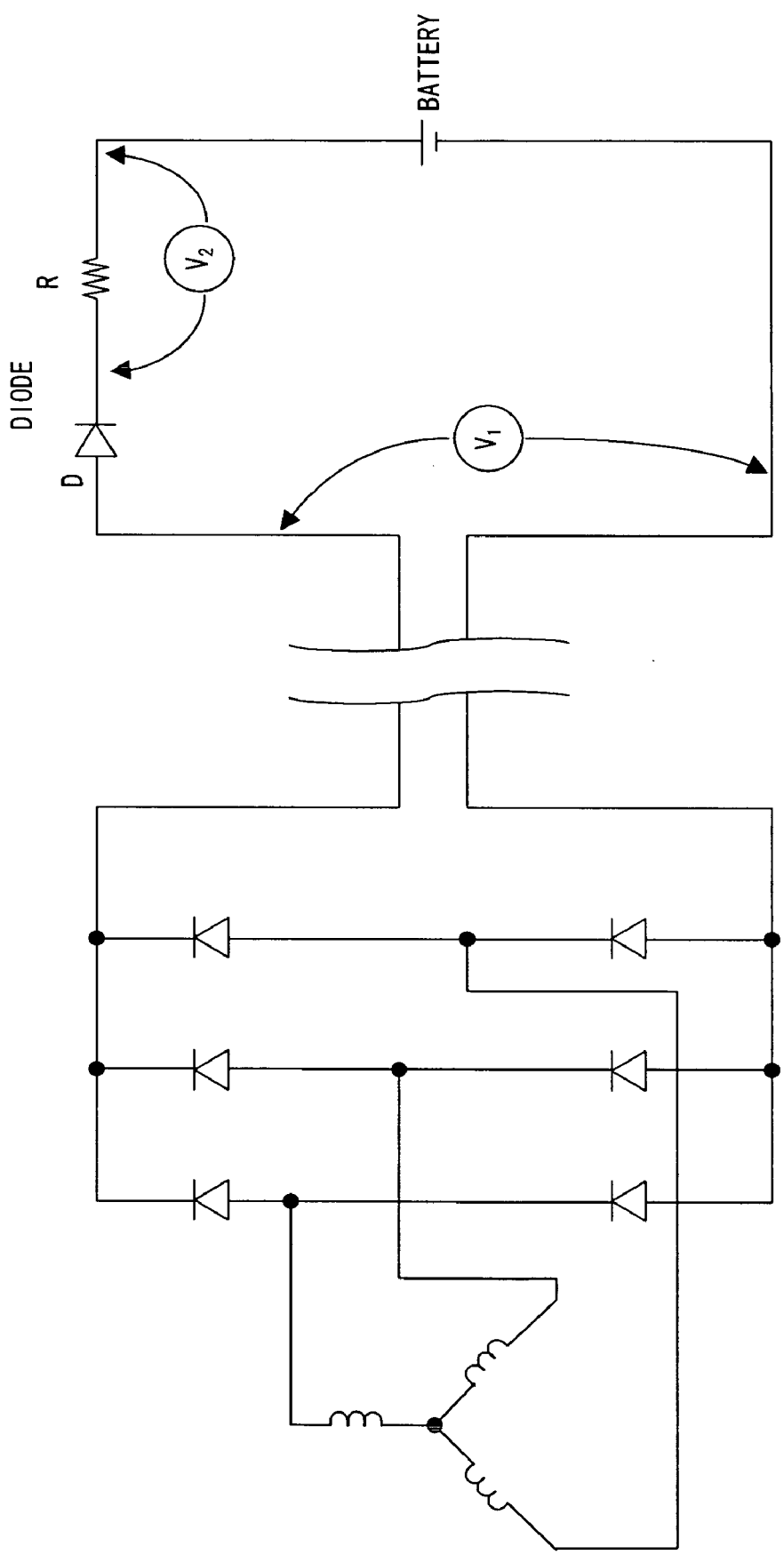

For example, if a wind power generator is directly connected to a storage battery, it is difficult to detect voltage pulsation since the rectified output of the generator is fixed to the voltage of the battery. Therefore, if the wind is weak and the number of rotations of the generator is small, in other words, if the peak output value of the generator does not reach the voltage of the battery, the number of rotations can be measured based on the pulsation of the output voltage V1 of the generator by inserting a diode between the plus terminal of the power wire and the plus terminal of the battery in the forward direction as shown in FIG. 5.

When wind becomes strong, the output voltage of the generator exceeds the voltage of the battery and the battery is charged, the output voltage V1 becomes flat[adg3] and it is difficult to measure the number of rotations. Therefore, a micro-resistor R is inserted for current measurement as shown in FIG. 5, and the number of rotations is measured based on the pulsation of the charging current.

FIG. 6 shows a compound circuit for enabling the stable measurement of the number of rotations across the entire wind velocity range by combining respective signals output from a voltage waveform amplifier at the time of a breeze and from a current waveform amplifier at the time of wind other than a breeze. Specifically, the number of rotations can be measured based on either a current waveform or a voltage waveform V1 from the resistor R, by inputting OR of the current waveform and voltage waveform V1 to an OP amplifier 100.

FIG. 7 is the circuit block diagram of the wind power generating device with a start-assisting function in the third preferred embodiment.

In FIG. 7, a wind power generating device 90 comprises a three-phase AC generator 61, a three-phase full-wave rectification circuit 62, a switching relay 63, a driving circuit 64, a timer device 65 and a rotation number measuring device 66.

A load circuit 70 charged by this wind power generating device 90 comprises a battery charging controller 71, a battery 72 and a DC/DC converter 73.

The three-phase AC generator 61 comprises a rotor 61a comprised of a permanent magnet and a stator comprised of a three-phase conduction coil 61b surrounding this rotor 61a. The switching relay 63 switches a generation mode for generating three-phase AC power in the stator 61b by rotating the rotor 61a of a windmill 67 rotated by wind, to a start assistance mode for starting rotation of the windmill 67 by allowing current to flow in the stator 61b from a driving circuit 64 and rotating the rotor 61a and vice versa.

Specifically, the generation mode and the start assistance mode correspond to a state in which the connecting switch of the switch relay 63 shown in FIG. 7 is open and a state in which the connecting switch is closed, respectively. In this start assistance mode, the three-phase AC generator 61 performs an intermittent rotating operation for start assistance, according to an instruction from the driving circuit 64.

In the case of the generation mode, that is, if the three-phase AC generator 61 is operated as a generator, when the windmill 67 receives wind of a velocity exceeding a predetermined velocity, the rotor 61a rotates. Then, the three-phase full-wave rectification circuit 62 converts three-phase AC voltage generated in the conduction coil 61b into DC voltage via the three-phase full-wave rectification circuit 62, based on the rotation of the rotor 61a and supplies the load circuit 70 after it with DC voltage.

The switch relay 63 switches three connecting switches from a voltage output side (at the time of generation) to a voltage input side (at the time of start-assistance) or vice versa, according to an instruction from the driving circuit 64.

The driving circuit 64 is started by a time-counting timing signal from a timer device 65 to determine the rotating direction of the rotor 61a as an armature, based on voltage output by the conduction coil 61b in the case where the rotor 61a rotates by inertia, to correct it to the correct rotating direction and to make the generator start rotation for start assistance. Simultaneously, the driving circuit 64 suspends the driving operation by another time-counting timing signal from the timer device 65. In this case, although the driving operation stops, the windmill 67 can rotate for a specific time by inertia obtained from the driving operation.

The timer device 65 comprises a time counting function as a first time counting means for counting a predetermined time for which the generator should be driven and rotated, using the point when the generation mode is switched to the start assistance mode as the reference, according to a notice from the rotation number measuring device 66, and a time counting function as a second time counting means for counting the time when the generator suspends the driving operation immediately after the time counting function as the first time counting means is terminated.

The predetermined time counted by the time counting function as the first time-counting means and the predetermined rotating/driving operation suspension time counted by the time counting function as the second time-counting means are, for example, 6 and 54 seconds, respectively. Either piece of the time counting time data is also set for the timer device by hardware or by software beforehand. During the rotating/driving operation suspension, the entire driving mode is always switched to generation mode (a state in which the connecting switches are switched to a contact terminal at the time of generation).

When the three-phase AC generator 61 generates in the generation mode, the rotation number measuring device 66 monitors the number of rotations N of the rotor 61a by referring to voltage $V_m$ rectified by the three-phase full-wave rectification circuit 62. When the number of rotations N drops below a predetermined number of rotations $N_a$, the rotation number measuring device 66 notifies the timer device 65 that the driving mode is switched from the generation mode to the start assistance mode.

The rotation number measuring device 66 monitors the number of rotations N of the rotor 61a of the three-phase AC generator 61 as a generator in the start assistance mode. When the number of rotations N exceeds the predetermined number of rotations $N_b$, the rotation number measuring device 66 notifies the timer device 65 that the driving mode is switched from the start assistance mode to the generation mode.

The predetermined number of rotations $N_a$ is, for example, 100 rpm, and the voltage $V_m$ ($=V_{ma}$) from the three-phase full-wave rectification circuit 62, corresponding to the number of rotations of $N_a$=100 rpm, is for example, 2V. This voltage $V_{ma}$=2V is set as a threshold value for rotation number detection by the rotation number measuring device 66 in advance by hardware or by software.

The predetermined number of rotations $N_b$ is, for example, 200 rpm. This number of rotations indicates that the windmill 37 rotating in the start assistance mode receives wind sufficient to generate and is rotated in excess of the rated rotating force of a generator.

The battery charging controller 71 of the load circuit 70 provided after the three-phase full-wave rectification circuit 62 monitors the charging state of the battery 72, and determines whether to supply the battery with DC voltage supplied by the three-phase full-wave rectification circuit 62.

The DC/DC converter 73 of the load circuit 20 extracts the voltage of the battery 72 and supplies the driving circuit 64, timer device 65 and rotation number measuring device 66 with voltage converted into optimal voltage. Power needed to drive the three-phase AC generator 61 as a generator is obtained by supplying the driving circuit 64 with voltage in the start assistant mode.

FIG. 8 is a flowchart showing the operation of the start assisting function of a fixed angle wing lift type horizontal shaft wind power generating device with the above-mentioned start assisting function. This process is performed by logic circuits built into the driving circuit 64, timer device 65, rotation number measuring device 66 and battery charging controller 71 shown in FIG. 7, or a central processing unit (CPU), which is not shown in FIG. 7 and a processing program stored in memory built into this CPU.

In FIG. 8, firstly, the rotation number measuring device 66 determines whether the number of rotations of a windmill, that is, the number of rotations N of the rotor 61a is less than a predetermined number of rotations $N_a$ (step S1).

If the number of rotations N of the rotor 61a is a predetermined number of rotations $N_a$ or more (N in S1), the rotation number measuring device 66 continues to monitor the number of rotations N of the rotor 61a. If the three-phase AC generator 61 is generating power in a generation mode, the generation is continued. If the rotor 61a as a generator is in an intermittent-rotation driving-operation suspension state in a start assistance mode and if it is rotating by inertia immediately after being switched to a generation mode, the rotation is continued.

If in step S1 it is determined that the number of rotations N of the rotor 61a is less than a predetermined number of rotations $N_a$ (Y in S1), the driving mode is switched to a start assistance mode (step S2). Specifically, the timer device 65 is started by a notice from the rotation number measuring device 66, and the driving circuit 64 operation is started by a timing signal from the timer device 65.

Then, the driving circuit 64 applies three-phased AC voltage for one cycle to the conduction coil 61b of the three-phased AC generator switched to a generator in the above-mentioned start assisting mode, and immediately stops applying voltage in the future. Then, the rotating direction of the inertia rotation by the drive for one cycle of the rotor 61a is referenced, and it is determined whether it is a forward rotation, which is a rotation in the direction of generation, or a rotation the reversal of it (step S3).

If it is rotation in[adg4] the forward direction (Y in S3), voltage is again applied to the conduction coil 61b of the three-phase AC generator as a generator and its application is continued. Then, time counting as a first time counting means by the timer device 65 (hereinafter called an "operation timer"), for example, a time count of six seconds is started, and it is determined whether its count period is over (step S5).

If the rotating direction detected in step S3 is a reverse rotating direction, the process proceeds to step 5 after the conduction timing to the conduction coil 61b is modified and rotation inversion (inversion to a rotation in the forward direction) is started (step S4).

If in step S5 it is determined that the time counting period of the operation timer is not over yet (N in S5), it is determined whether the number of rotations N of the rotor 61a is less than the predetermined number of rotations $N_b$ (step S6).

If the number of rotations N of the rotor 61a is less than the predetermined number of rotations $N_b$ (N in S6), the process returns to step S5, and the determination as to whether the time counting period of the operation timer is over is repeated. Thus, if the operation timer is counting and if the number of rotations N of the rotor 61a is less than the predetermined number of rotations $N_b$, the rotation of a generator in steps S3 and S4 is continued, and the start assistance rotation of the rotor 61a, that is, the windmill is accelerated.

Then, if in step S5 it is determined that the time counting period of the operation timer is over (Y in S5), time counting as a second time counting means by the timer device 65 (hereinafter called a "waiting timer") is started, and it is determined whether the time counting is over (step S7). Then, a waiting state is set until the time counting is over (N in S7).

Thus, if the number of rotations N of the rotor 61a is less than the predetermined number of rotations $N_b$ and if the time counting period of the operation timer is over, a predetermined period set in the waiting timer in advance, for example, a waiting period of 54 seconds, is set, and useless start assisting rotation at the time of no wind can be avoided during the predetermined period (54 seconds).

Thus, if the time counting period of the operation timer is six seconds although the time counting period of the waiting timer is 54 seconds, the entire driving period is reduced to 1/10, and 9/10 can be saved compared with a case where the start assisting rotation is continued until the generating device enters into a generation state.

When the above-mentioned waiting period is over (Y in S7), the process returns to step S1 again, and the above-mentioned processes in steps S1 through S7 are repeated.

Thus, six-second start assisting rotation is performed every minute until in step S6 it is determined that the number of rotations N of the rotor 61a exceeds the predetermined number of rotations $N_b$.

If in step S6 it is determined that the number of rotations N of the rotor 61a exceeds the predetermined number of rotations $N_b$ (Y in S6), the start assisting rotation driving operation by the driving circuit 64 is suspended by a notice issued by the rotation number measuring device 66 via the timer device 65. The driving mode is switched to a generation mode.

With this switch, control is taken over by the battery charging controller 71, and the battery charging controller 71 determines whether to charge using [adg5] generated power (step S8).

In this process, it is determined that charging is not required, since the battery 72 is sufficiently charged, or power sufficient to charge cannot be obtained from the three-phase AC generator because the wind velocity drops after repeated charging. In other words it is determined whether charge is possible.

If it is determined that charging is possible (Y in S8), the battery 72 is charged (step S9), and the processes in steps S8 and S9 are repeated. Thus, the battery 72 continues to be charged by the three-phase AC generator 61.

If in step S8 it is determined that charging is not possible (N in S8), the process proceeds to the above-mentioned process in step S7. Thus, if power sufficient to charge cannot be obtained from the three-phase AC generator because the wind velocity drops, the process proceeds to the start assistance mode in steps S1 through S7. If the wind velocity is sufficient to generate and the battery 72 is sufficiently charged, the battery charging controller 71 automatically controls the windmill 72 in such a way as to not generate power.

As described above, according to the present invention, since a start assisting rotation is performed by the start assisting function at short-circuit intervals of, for example, once every minute, rotation can be triggered at the time of weak winds as long as generating rotation is possible, and accordingly, the degradation of generation efficiency can be prevented. Simultaneously, a great velocity change due to weak winds can also be coped with, and generation efficiency can be improved without losing generation opportunities.

Figure 9:
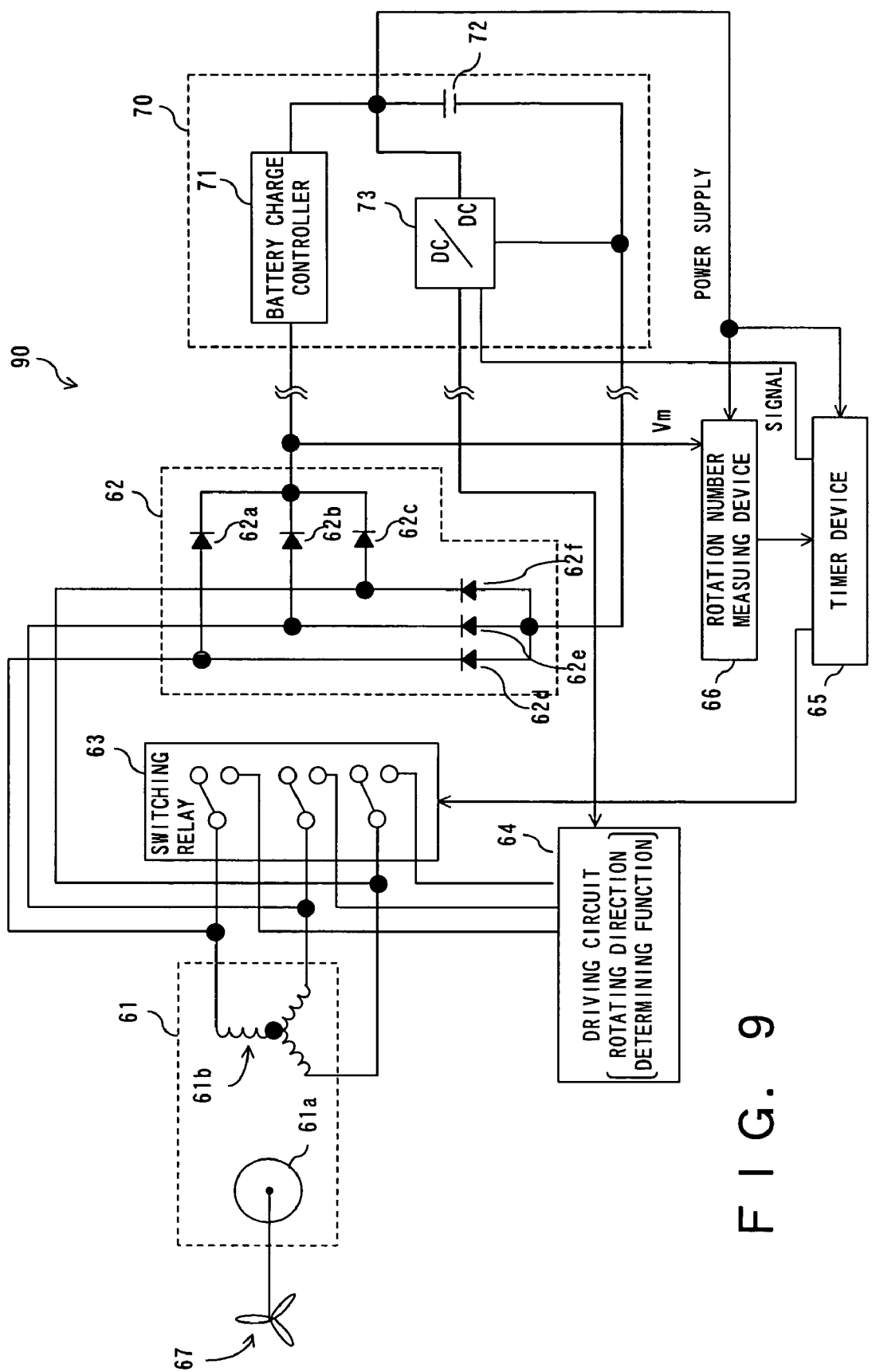
FIG. 9 is the circuit block diagram of the wind power generating device capable of saving its self consumption power by making a timer device independent of it in the fourth preferred embodiment.

FIG. 9 shows the circuit block diagram of the horizontal shaft wind power generating device capable of saving self consumption power by making the timer device independent in the fourth preferred embodiment.

Although in the example shown in FIG. 7, the DC/DC converter 73 always supplies the timer device 65 with power, in the example shown in FIG. 9, the battery 72 always supplies the timer device 65 with power. The timer device 65 performs the condition determination of the rotary number measuring device 66 and also supplies the driving circuit 64 with power by originating a power request signal to the DC/DC converter 73. Thus, except when starting the start assisting function, the DC/DC converter 73 can be suspended, and the entire consumption power can be saved.

Although in the above description, the switching between a generation mode and a start assistance mode can be made by switching a connection switch using a switching relay 13, the switching is not limited to a relay, and a semiconductor device, such as a photo-coupler, a field-effect transistor (FET) or the like can constitute such a switch unit.

There is no need to fix the time counting periods set as a driving time and a suspension time in the operation timer and waiting timer to six and 54 seconds, respectively. Furthermore, there is no need to fix the ratio between them to 1/10. For example, they can also be properly set depending on the time zone of a day, the season, the area or the like.

Although the operational setting of the start assisting function shown in FIG. 8 is not especially described, power for the start assisting function is wasted when a no wind state continues for a long time, if the start assisting function is set in such a way as to always operate instead of once every minute as described above.

Thus, a manual switch or a remote-control switch can also be provided, and the operation setting of the start assisting function can also be switched between "set" and "release" by the switch.

Furthermore, a circuit capable of detecting that battery voltage which is supplied with power drops below a specific value and automatically suspending the supply of power to the DC/DC converter 73 can also be added.

Alternatively, a wind velocity sensing device, such as a wind velocity sensor or the like, or a wind velocity measuring device composed of a vertical shaft bow-shaped blade type wind mill and the like can also be provided to measure wind velocity, and the operation switch of the start assisting function can also be switched on when the wind velocity becomes larger than a predetermined one. In this case, it is preferable for the wind velocity measuring device to be small and to sense a breeze to operate.

Figure 10:
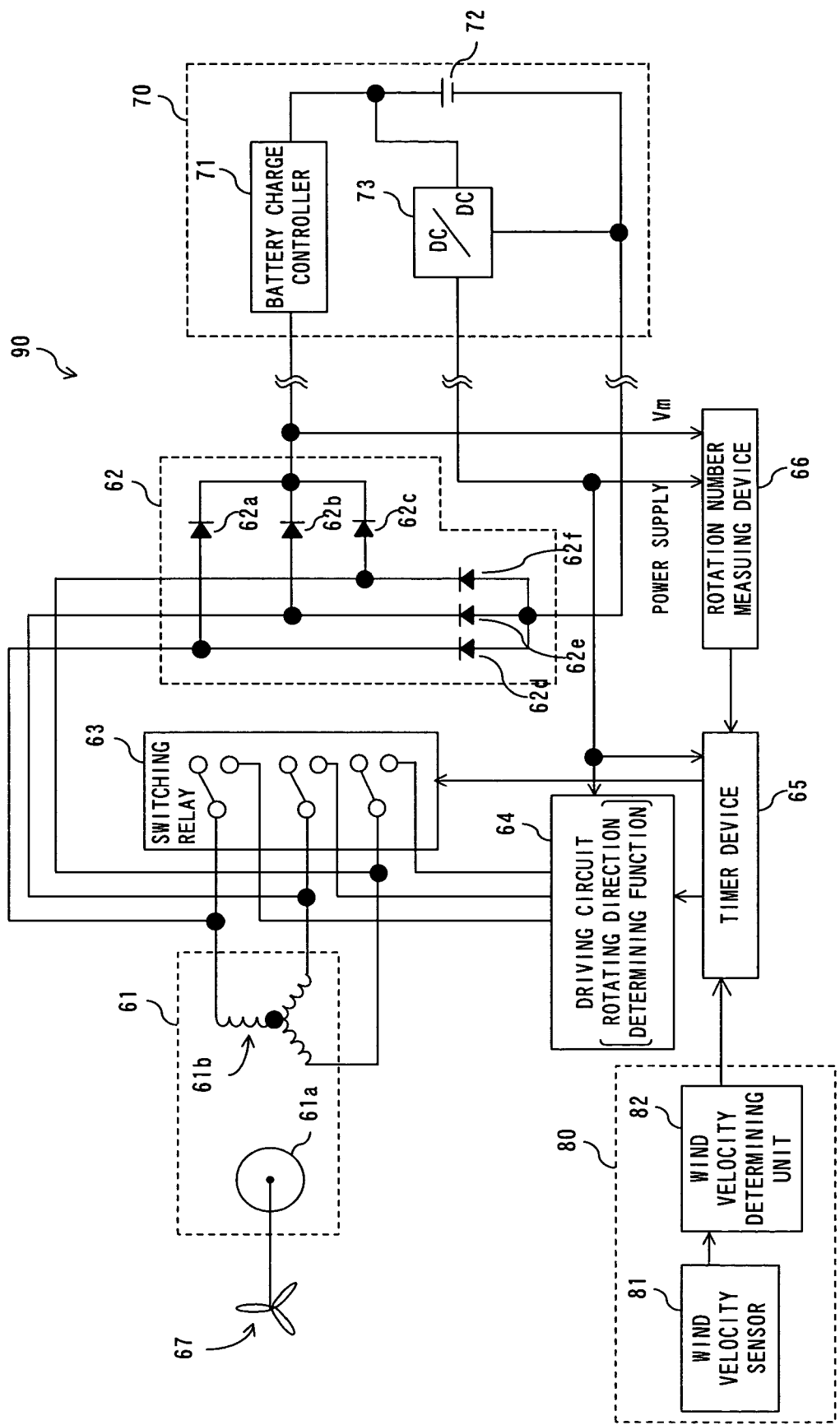
FIG. 10 is the circuit block diagram of the wind power generating device for monitoring the starting timing of the start assisting function by a wind velocity sensor.

FIG. 10 shows an example of a circuit for monitoring the starting timing of the start assisting function by such a wind velocity sensor. As shown in FIG. 10, a wind velocity detection device 80 is separately disposed in the vicinity of the fixed angle wing lift type horizontal shaft wind power generating device 90.

The wind velocity detection device 80 comprises a wind velocity sensor 81 and a wind velocity determining unit 82. A wind velocity value suitable to start operating the start assisting function is set in the wind velocity determining unit 82 in advance by hardware or software. The wind velocity determining unit 82 compares a wind velocity value measured and input by the wind velocity sensor 81 with the above-mentioned predetermined wind velocity, and notifies the timer device 65 of the operational timing of the start assisting function.

Thus, the time counting by the waiting timer in step S7 shown in FIG. 8 is started, and the processes in steps S8 and S9, that is, the start assisting function starts to operate. Thus, power waste by the useless operation of the start assisting function can be automatically avoided at the time of no wind.

As described above, according to the fixed angle wing lift type horizontal shaft wind power generating device, since the start assisting rotation is performed by the start assisting function even at the time of weak winds by which an ordinary lift type horizontal shaft wind power generator cannot be rotated, a regular rotation can be started by the inertia of this start assisting rotation even at the time of weak winds by which an ordinary lift type horizontal shaft wind power generator cannot be rotated.

Furthermore, since a generator is used as both a regular generator and a start assisting generator, the generator can be miniaturized although it is provided with a start assisting function. Accordingly, an inexpensive fixed angle wing lift type horizontal shaft wind power generating device can be realized.

Furthermore, since a long intermittent rotation is performed during a driving operation suspension period as a start assisting rotation, power used for the start assisting rotation can be reduced as much as possible. Thus, a fixed angle wing lift type horizontal shaft wind power generating device with a start assisting function whose self consumption power is reduced although it is provided with a start assisting function can be realized.

Furthermore, since the start assisting function is operated only when sufficiently strong winds occur while monitoring wind velocity, a fixed angle wing lift type horizontal shaft wind power generating device with a start assisting function whose self consumption power for the start assisting rotation is further reduced can be realized.

The third and fourth preferred embodiments can achieve the fourth object of the present invention.

Although in the first through fourth preferred embodiments, each preferred embodiment is separately described, a wind power generating device with each of their features can also be realized by combining them. In this case, since the wind power generating device is provided with each of their preferred embodiments, a better wind power generating device can be realized. This applies to items described bellow.

In wind power generating, usually uncontrollable and dangerous high-speed rotation is prevented by suspending a windmill or reducing its rotation speed at the time of winds of a velocity higher than an operational limit. As such a method, pitch control of a blade and mechanical control, such as a disk brake, a furling or the like are used. However, the lift type fixed pitch horizontal shaft windmill can be electro-magnetically controlled by short-circuiting the output of a generator. For a method for determining automatic suspension In Order To Avoid Such A Danger, there is a method for measuring one or more of wind velocity, the number of rotations, generating power and the like (see FIG. 11).

Figure 11:
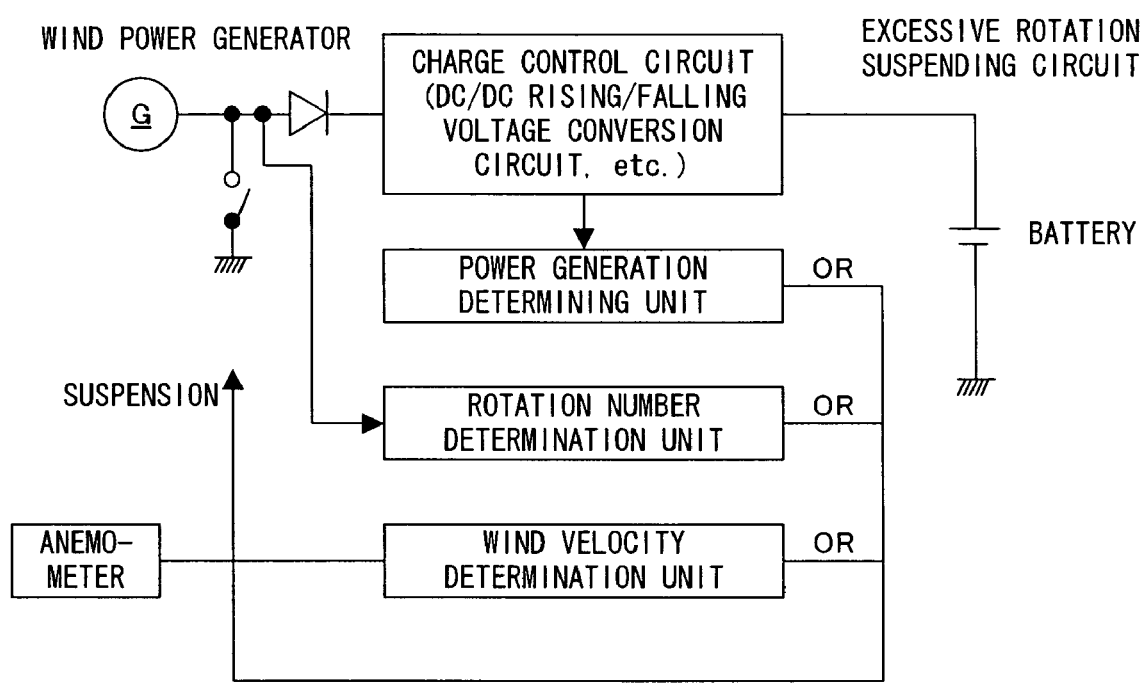
FIGS. 11~13 explain wind velocity measurement by short-circuit current at the time of suspension.

In FIG. 11, each of a generating power determining unit for determining generating power using a charge control circuit, a rotation number determining unit and a wind velocity determining unit performs its measurement and switches its circuit in order to charge or not, based on the result.

In a lift type fixed pitch horizontal shaft windmill, if the windmill is electro-magnetically controlled by short-circuiting the output of a generator, no blade completely stops and continues to rotate slowly against the wind. In other words, power generated by rotation is consumed by a short-circuit circuit. In a low-speed rotation state at the time of suspension, almost no rotation torque by lift can be obtained, and rotation torque by drag dominates. In other words, its principle is the same as that of a propeller type anemometer, and its number of rotations is almost proportional to the wind velocity. Simultaneously, the short-circuit current is also proportional to the wind velocity.

Figure 12:
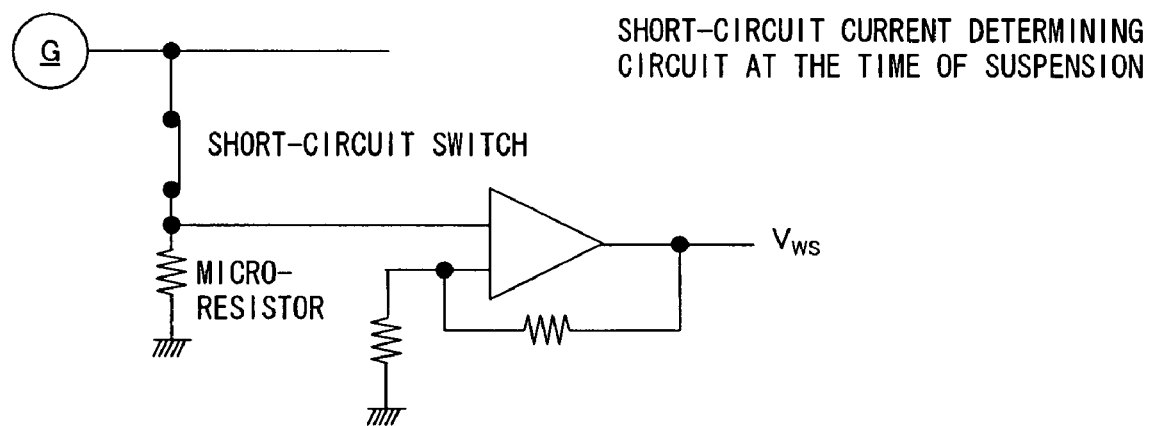
Figure 13:
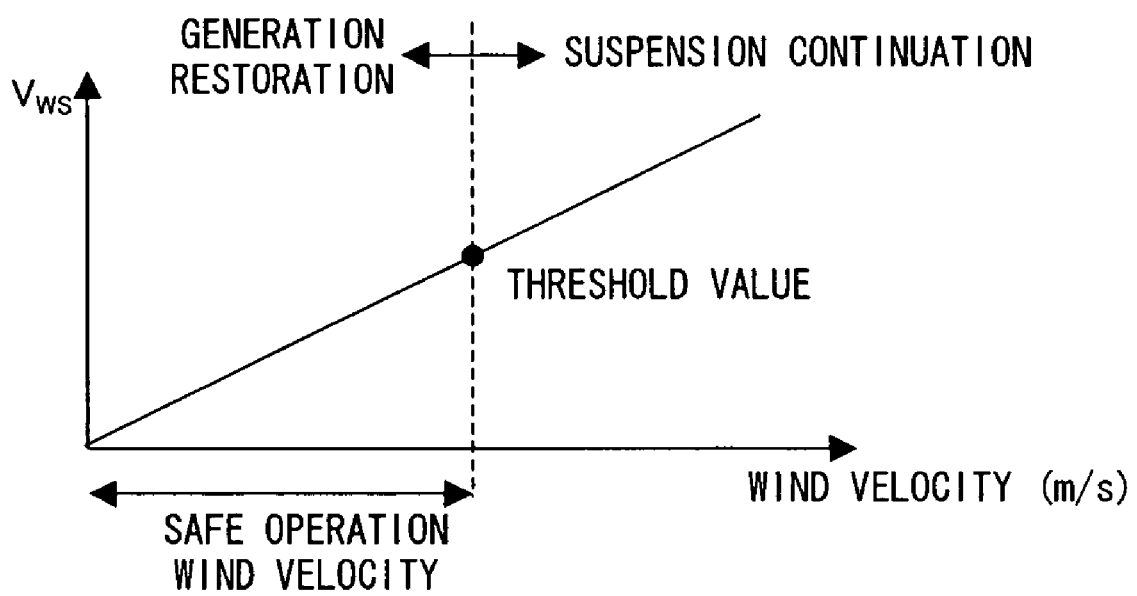

A suspension state is maintained by a timer for a predetermined time after the start of automatic suspension. However, in a system without a wind velocity measuring function, whether wind velocity is within an operable range can be determined at the time of restoration by measuring this short-circuit current (see FIG. 12; this is a short-circuit current determining circuit at the time of suspension, which can measure the short-circuit current generated by shorting it using a short-circuit switch). In this case, a short-circuit current value at the upper limit wind velocity where the windmill can be safely operated is specified as a threshold value. If the short-circuit current value is less than the threshold value, the windmill is restored. If it is equal to or more than the threshold value, the suspension state is further maintained for the predetermined time (see FIG. 13).

If the stored power capacity of the battery is normal and the charge control circuit is supplied with power, the windmill can be suspended before its rotation speed becomes high. In this preferred embodiment, when suspension cannot be controlled due to the insufficient capacity or disconnection of the battery, failure of the control circuit or the like, the input of the wind power generator is auxiliary short-circuited.

A factor for determining that it is necessary to suspend is the decrease of battery voltage and the increase of generator output voltage.

Figure 14:
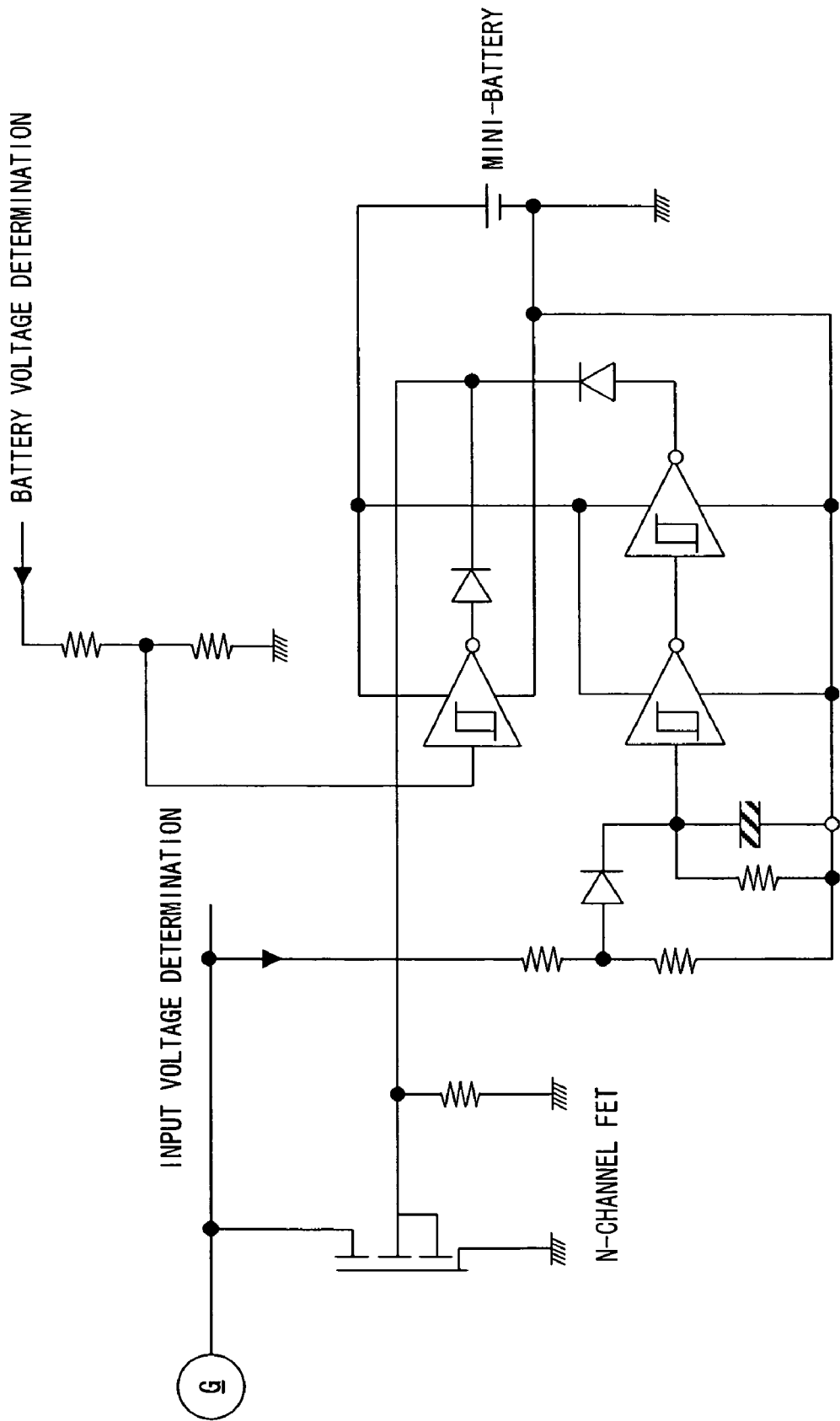
FIG. 14 explains the assistance suspension circuit for no power supply and a release failure.

A circuit shown in FIG. 14 comprises an N-channel FET for short-circuiting a wind power generator, a Schmidt trigger inverter and a 6V battery. When the voltage of the battery drops below a predetermined value or when the wind power generator is opened and its input voltage exceeds a predetermined value, a DC potential is applied to an FET gate and this circuit is short-circuited. If this circuit returns to a normal system state, the short-circuited state automatically returns to an open state. Since the Schmidt trigger inverter is comprised of CMOS or the gate circuit of the FET is insulated, almost no power of the small battery is consumed, and the circuit can operate for a long time without changing the battery.

A power conversion method for instructing that the input voltage should be a maximum power point against the fluctuations of wind velocity is publicly known. In the prior art, although a method for finely changing input voltage and modifying the input voltage until generating power becomes a maximum is adopted, current instantaneous power is simply calculated and fed back.

However, in the preferred embodiment, by storing previous fluctuations as the fluctuation history of the maximum power point, the increase/decrease of wind velocity is predicted, an input voltage specifying value is determined and the device is controlled. Therefore, both the speed of a response to wind velocity fluctuations and efficiency can be improved.

If wind velocity for the previous several seconds tends to increase, the maximum power point also tends to increase. The amount of power for the future several seconds is predicted based on the inclination of the increased amount of power, and the input voltage specifying value is determined. If the wind velocity is increasing, the input voltage specifying value is determined at a level higher than the voltage at the maximum power point. Thus, the load of the windmill is temporarily reduced, and the increasing speed of the number of rotations becomes fast. Thus, wind velocity increase can be quickly followed. When wind velocity is decreasing, an operation the reversal of it is performed.

Figure 15:
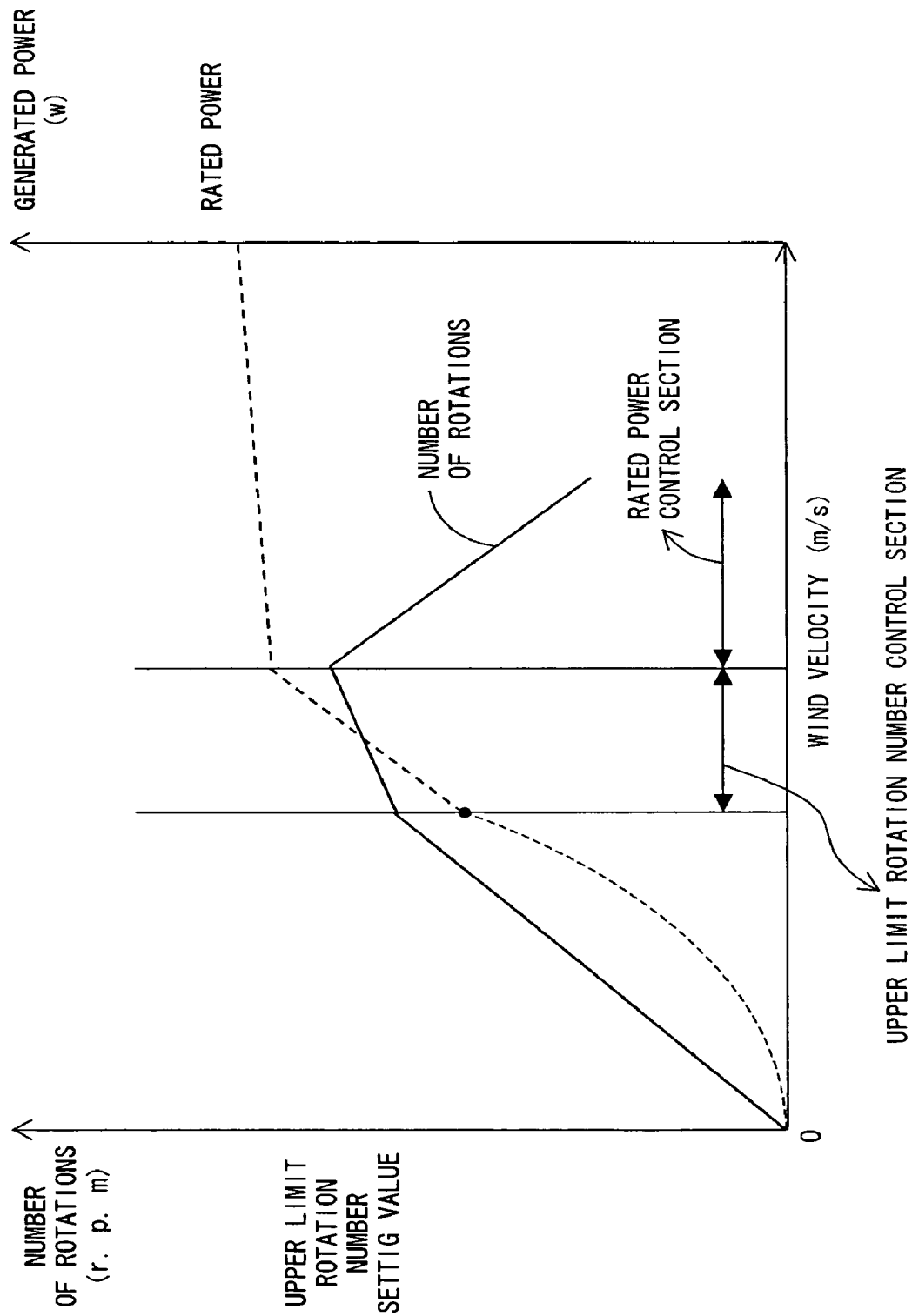
FIG. 15 explains rated power control.

FIG. 15 explains rated power control.

If the wind velocity increases and generating power exceeds a rated power value while operating the generating device at the preset upper limit number of rotations, the generating device can be controlled in such a way that the generating power may not exceed the rated power by instructing the reduction of the upper limit number of rotations instead of suspending, specifically controlling the input specifying voltage against a difference in excess of (90 percent of) the rated power instead of a difference between the number of rotations and the preset number of rotations.

In reality, as shown in FIG. 15, power is controlled at a level lower by approximately 10 percent than the rated power instead of after it exceeds the rated power.

The invention claimed is:

1. A fixed angle wing lift type horizontal shaft wind power generating device with a start assisting function, comprising:
    a permanent magnet type generator for generating power in connection with a rotation shaft of a rotation wing which is rotated in the forward direction by wind;
    a start assistance unit for switching the generator to a motor and performing a start assisting rotation which rotates the rotation shaft in the forward direction; and
    a generation restoring unit for restoring the motor to the generator when the start assisting rotation by the start assistance unit is suspended; and
    a control unit for repeatedly changing operations of the start assistance unit and the generation restoring unit, the rotation rate of the rotation wing being swiftly increased above a predetermined value,
    wherein a regular rotation can be started by the inertia of the start assisting rotation even at the time of winds too weak to rotate an ordinary fixed angle wing lift type horizontal shaft wind power generator alone.

2. The fixed angle wing lift type horizontal shaft wind power generating device according to claim 1, wherein
    said start assistance unit comprises a storage battery, a solar cell or an auxiliary wind power generator as a power supply for performing the start assisting rotation.

3. The fixed angle wing lift type horizontal shaft wind power generating device according to claim 1 or 2, further comprising
    a start assisting rotation time determining unit for determining when said start assistance unit performs the start assisting rotation.

4. The fixed angle wing lift type horizontal shaft wind power generating device according to claim 3, wherein
    said start assisting rotation time determining unit further comprises
    a wind velocity measuring unit; and
    a first time counting unit, wherein
    if wind velocity measured by said start assisting rotation time determining unit is lower than a predetermined velocity, said start assisting rotation time determining unit operates said start assistance unit only during a time counting period of said first time counting unit.

5. The fixed angle wing lift type horizontal shaft wind power generating device according to claim 4, wherein
    said start assisting rotation time determining unit further comprises
    a second time counting unit, wherein
    after the time counting period of said first time counting unit is over, said start assisting rotation time determining unit starts time counting by said second time counting unit, and after the time counting period of said second time counting unit is over, said start assisting rotation time determining unit starts wind velocity time counting by said wind velocity measuring unit.

6. The fixed angle wing lift type horizontal shaft wind power generating device according to claim 5, wherein
    the time counting period of said first time counting unit is shorter than the time counting period of said second time counting unit.

7. The fixed angle wing lift type horizontal shaft wind power generating device according to claim 1, wherein
    the number of rotations of a windmill is counted using pulsating current of output voltage from a generator when the wind is weak and using pulsating current of charging current when the wind is strong.

8. A method for operating a fixed angle wing lift type horizontal shaft wind power generating device comprising a permanent magnet type generator for generating in connection with a rotation shaft of a rotation wing which is rotated in the forward direction by the wind, a switch unit for switching the generator to a motor, a wind velocity measuring unit, a first time counting unit and a second time counting unit having a time counting period longer than a time counting period of the first time counting unit, comprising:
    operating a start assisting function when the wind velocity measuring unit detects a wind velocity lower than a predetermined velocity;
    continuing operation of the start assisting function only during a time counting period of the first time counting unit;

suspending the operation of the start assisting function during a time counting period of the second time counting unit and switching the motor to the generator by the switch unit;

monitoring whether the output voltage from a coil stator of the generator is equal to or more than a predetermined voltage during the repetition process;

charging a battery with the output voltage of the generator when having detected a voltage higher than the predetermined voltage in the voltage monitoring process; and repeatedly changing operations of the start assistance process and the generation restoring process, the rotation rate of the rotation wing being swiftly increased above a predetermined value, wherein a regular rotation can be started by the inertia of the start assisting rotation even at the time of winds too weak to rotate an ordinary fixed angle wing lift type horizontal shaft wind power generator alone.

* * * * *